United States Patent [19]
Saga

[11] Patent Number: 5,991,247
[45] Date of Patent: *Nov. 23, 1999

[54] OPTICAL INFORMATION RECORDING/ REPRODUCING APPARATUS AND METHOD WHEREIN AN ELASTIC MEMBER SUPPORTING AN OBJECTIVE LENS HOLDER IS SET IN A NEUTRAL STATE

[75] Inventor: Yoshihiro Saga, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/595,481

[22] Filed: Feb. 1, 1996

[30] Foreign Application Priority Data

Feb. 1, 1995 [JP] Japan ................................. 7-015344
Jan. 30, 1996 [JP] Japan ................................. 8-013962

[51] Int. Cl.$^6$ ........................................... G11B 7/00
[52] U.S. Cl. ........................... 369/44.28; 369/44.16
[58] Field of Search ....................... 369/44.14–44.16, 369/44.28, 44.32, 54

[56] References Cited

U.S. PATENT DOCUMENTS

| | | | |
|---|---|---|---|
| 4,613,963 | 9/1986 | Hirano | 369/44.28 |
| 4,769,803 | 9/1988 | Yamamiya | 369/44.16 |
| 5,150,343 | 9/1992 | Goto et al. | 369/44.14 X |
| 5,463,612 | 10/1995 | Date | 369/44.16 X |
| 5,467,328 | 11/1995 | Murakami et al. | 369/44.16 |
| 5,475,661 | 12/1995 | Tomita et al. | 369/44.16 |
| 5,636,068 | 6/1997 | Tanaka | 369/44.16 X |

FOREIGN PATENT DOCUMENTS

5-298724  11/1993  Japan.

*Primary Examiner*—W. R. Young
*Attorney, Agent, or Firm*—Fitzpatrick, Cella, Harper & Scinto

[57] ABSTRACT

In an optical information recording/reproducing apparatus which uses an actuator which can move a beam spot over the entire track area on a recording medium by supporting an objective lens for converging the beam spot on an optical disk by elastic members, the objective lens is located at the neutral position of the elastic members during a period other than the recording or reproduction operation of information, thereby reducing power consumption.

7 Claims, 12 Drawing Sheets

OPTICAL INFORMATION RECORDING/ REPRODUCING APPARATUS AND METHOD WHEREIN AN ELASTIC MEMBER SUPPORTING AN OBJECTIVE LENS HOLDER IS SET IN A NEUTRAL STATE

BACKGROUND OF THE INVENTION

1. Field of the Invention

The present invention relates to an optical information recording/reproducing apparatus such as an optical disk apparatus, a magnetooptical disk apparatus, and the like and, more particularly, to an apparatus providing a reduction of power consumption upon execution of focusing or tracking servo control of the information recording/reproducing apparatus.

2. Related Background Art

Conventionally, an objective lens driving device for an optical disk apparatus is normally constituted by two units, i.e., a lens actuator unit for driving an objective lens within the near-distance range, and a linear motor unit for moving the lens actuator unit over the entire track area.

Figure 1:
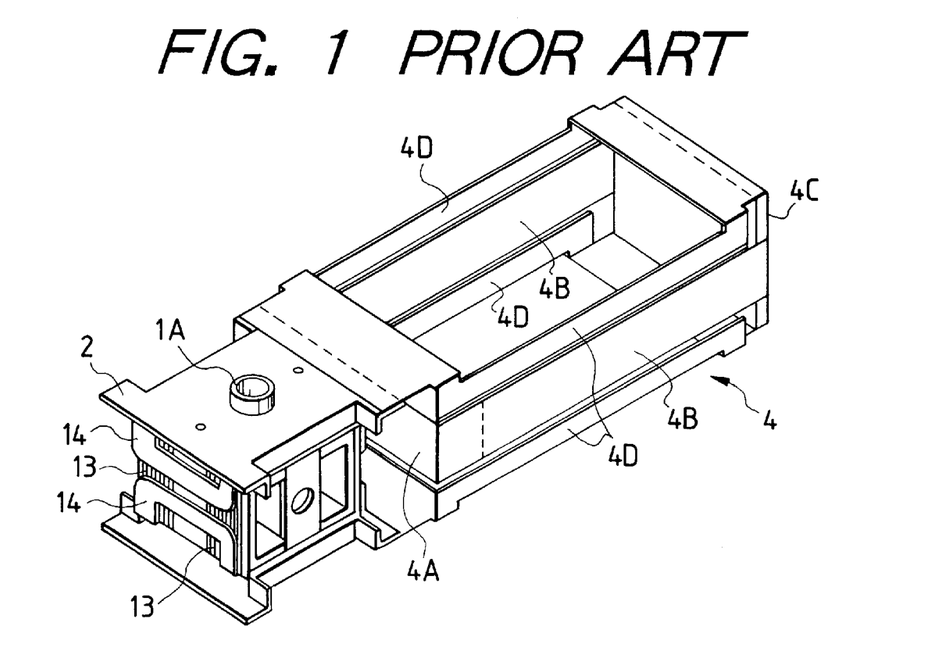
FIG. 1 is a perspective view showing the arrangement of an actuator according to the present invention and a prior art.
Figure 2:
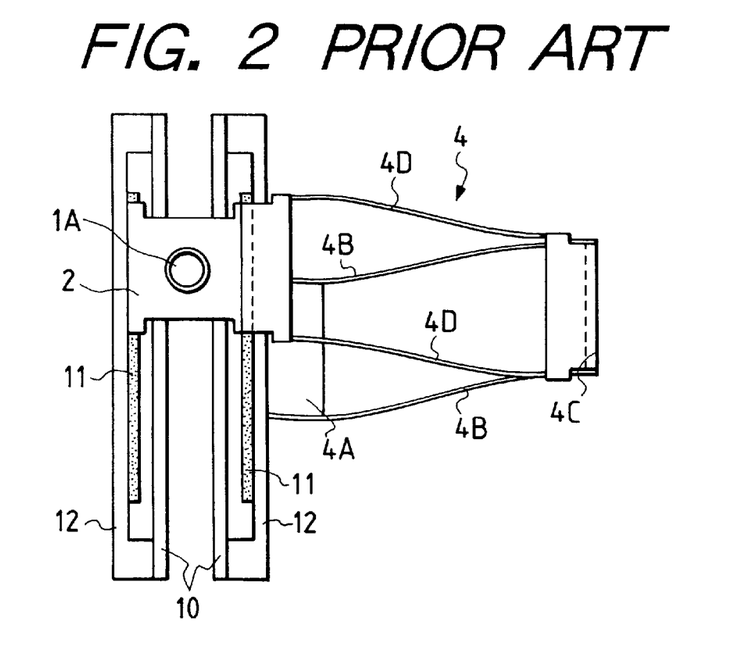
FIG. 2 is a view showing the arrangement of the actuator according to the present invention and the prior art.

However, in recent years, in order to attain a high-speed access to an information track, a lightweight objective lens driving device has been proposed. Japanese Laid-Open Patent Application No. 5-298724 discloses such an objective lens driving device. FIGS. 1 and 2 show the objective lens driving device disclosed in Japanese Laid-Open Patent Application No. 5-298724. The objective lens driving device (to be simply referred to as an actuator hereinafter) shown in FIGS. 1 and 2 is arranged in such a manner that an objective lens is supported by a leaf spring, and can be moved in the tracking direction over the entire track area upon deflection of the leaf spring.

Referring to FIGS. 1 and 2, an objective lens 1A irradiates a recording/reproducing spot onto the surface of an optical disk. A holder 2 is arranged in a fixed optical head unit (not shown), and holds a pop-up mirror for deflecting a laser beam emitted by a light source toward the objective lens. Inner yokes 10 extend in a direction parallel to the tracking direction, and extend through the centers of tracking coils 13. An outer yoke 12 extends parallel to each inner yoke 10, and is coupled thereto at its two end portions. A magnet 11 is attached to each outer yoke 12, and constitutes a magnetic circuit for applying a magnetic flux in a direction perpendicular to each coil 13. Note that a focusing coil 14 is arranged on the holder 2.

A parallel leaf spring member has the following arrangement. A fixed base member 4A is fixed to one outer yoke 12. Leaf springs 4B are connected to the fixed base member 4A. A movable frame member 4C is connected to the end portions, opposite to the member 4A, of the leaf springs 4B. Leaf springs 4D are connected to the movable frame member 4C. The objective lens holder 2 is connected to the end portions, opposite to the member 4C, of the leaf springs 4D. With this arrangement, when the actuator is driven, the movable frame member 4C moves in an arcuated pattern since the leaf springs 4B are deflected. At the same time, since the leaf springs 4D are deflected, the objective lens holder 2 moves along a linear path. FIG. 2 shows the state of the objective lens driving device when the leaf springs are deflected. The objective lens holder 2 is driven by the magnetic circuit, and are moved along the inner yokes 10. At this time, the parallel leaf spring member allows movement in the tracking direction upon bending of the leaf spring 4B while supporting the objective lens holder 2. Thus, the objective lens driving device does not require the two-unit arrangement, and the movable portion mass of the objective lens driving device can be greatly reduced.

Since the objective lens holder 2 is supported by the springs, when the objective lens holder 2 is located at a position other than the neutral position of the springs, a spring force for carrying the objective lens holder 2 to the neutral position of the springs is generated. Therefore, when the objective lens holder 2 is to be held at a position other than the neutral position of the springs, a current must be kept supplied to the coils to generate a driving force against the spring force.

In a recording/reproducing apparatus such as an optical disk apparatus, when recording or reproduction is not performed, the irradiation point of the beam spot is held at the last position of the recording or reproduction.

Figure 3:
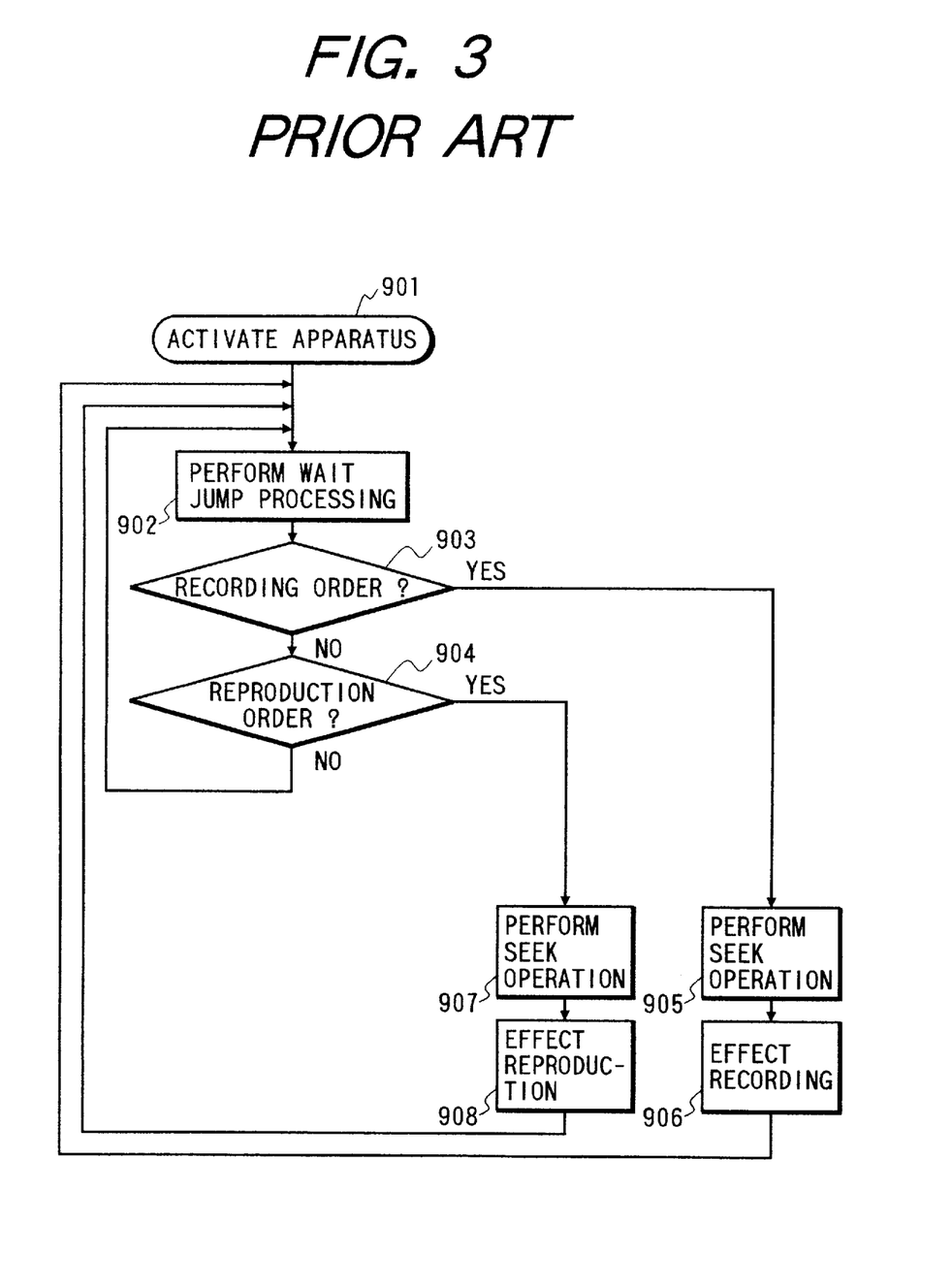
FIG. 3 is a flow chart showing processing executed in the prior art.

FIG. 3 is a flow chart showing the operation of the conventional optical disk apparatus. Referring to FIG. 3, when the optical disk apparatus is activated (step 901), the control executes a loop consisting of wait jump processing (step 902), recording discrimination branch processing (step 903), and reproduction discrimination branch processing (step 904), and waits for a recording or reproducing order from a system controller while executing wait jump processing. Upon reception of a recording or reproducing order, the control moves the irradiation point of the beam spot to a predetermined address (step 905) or (step 907), and performs a recording or reproduction operation (step 906) or (step 908). Upon completion of the recording or reproduction operation, the control waits for an order from the system controller while executing a wait operation at the end position of the recording or reproduction operation.

In the conventional optical disk apparatus, the wait jump processing is performed as follows. An optical disk normally has spiral tracks. For this reason, when the beam spot position is controlled to trace a track, the beam spot moves to an unexpected position along the spiral tracks. In order to hold the irradiation position of the beam spot at a predetermined position, the beam spot is jumped to be returned by one track per revolution of the disk. With this operation, the beam spot can be held at the desired position on the disk.

However, in order to hold the irradiation position of the beam spot at the last recorded or reproduced position using the above-mentioned spring-supported actuator, the actuator requires a driving force against the spring force of the springs, and a current must be kept supplied to the coils, resulting in a large power consumption of the apparatus. In particular, except for a case wherein the focusing or tracking servo time matches the recording or reproducing time, electric power consumed by the servo control is not effective.

SUMMARY OF THE INVENTION

It is an object of the present invention to reduce the power consumption of an apparatus using a spring-supported actuator.

In order to achieve the above object, there is provided an optical information recording/reproducing apparatus, which can attain tracking control and/or focusing control of a beam spot by supporting, by an elastic member, a holder which holds an objective lens for forming the beam spot on an optical information recording medium, wherein the elastic member is set in a neutral state when the apparatus waits for a recording or reproduction operation of information.

Also, in order to achieve the above object, there is provided an optical information recording/reproducing method of recording and/or reproducing information while performing tracking control and/or focusing control of a beam spot by driving an objective lens supported by an elastic member, comprising the steps of:

executing recording or reproduction of information; and setting the elastic member in a neutral state when control waits for the recording or reproduction of the information.

The above and other objects will become apparent from the following description of the preferred embodiments. dr

Figure 4:
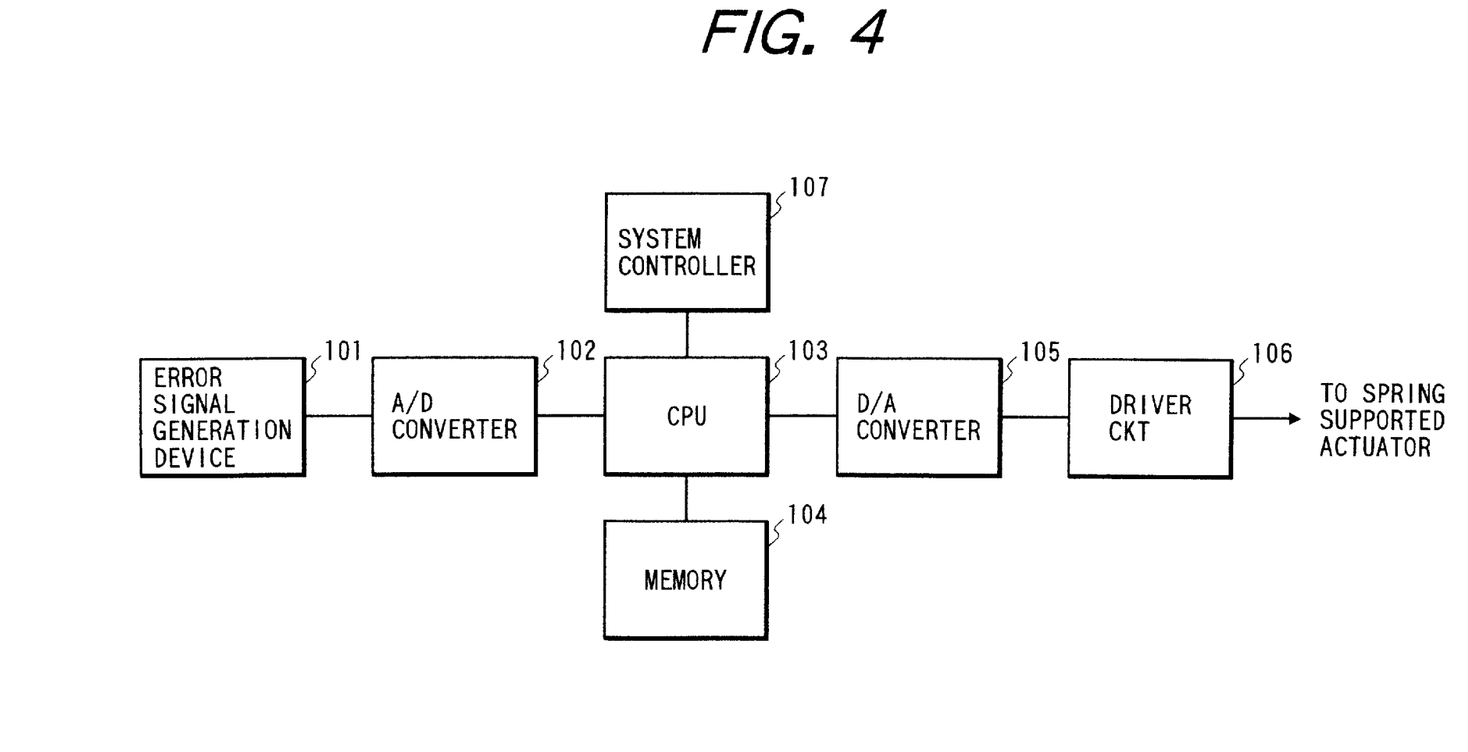
FIG. 4 is a block diagram showing a portion of the arrangement of the present invention.
Figure 5:
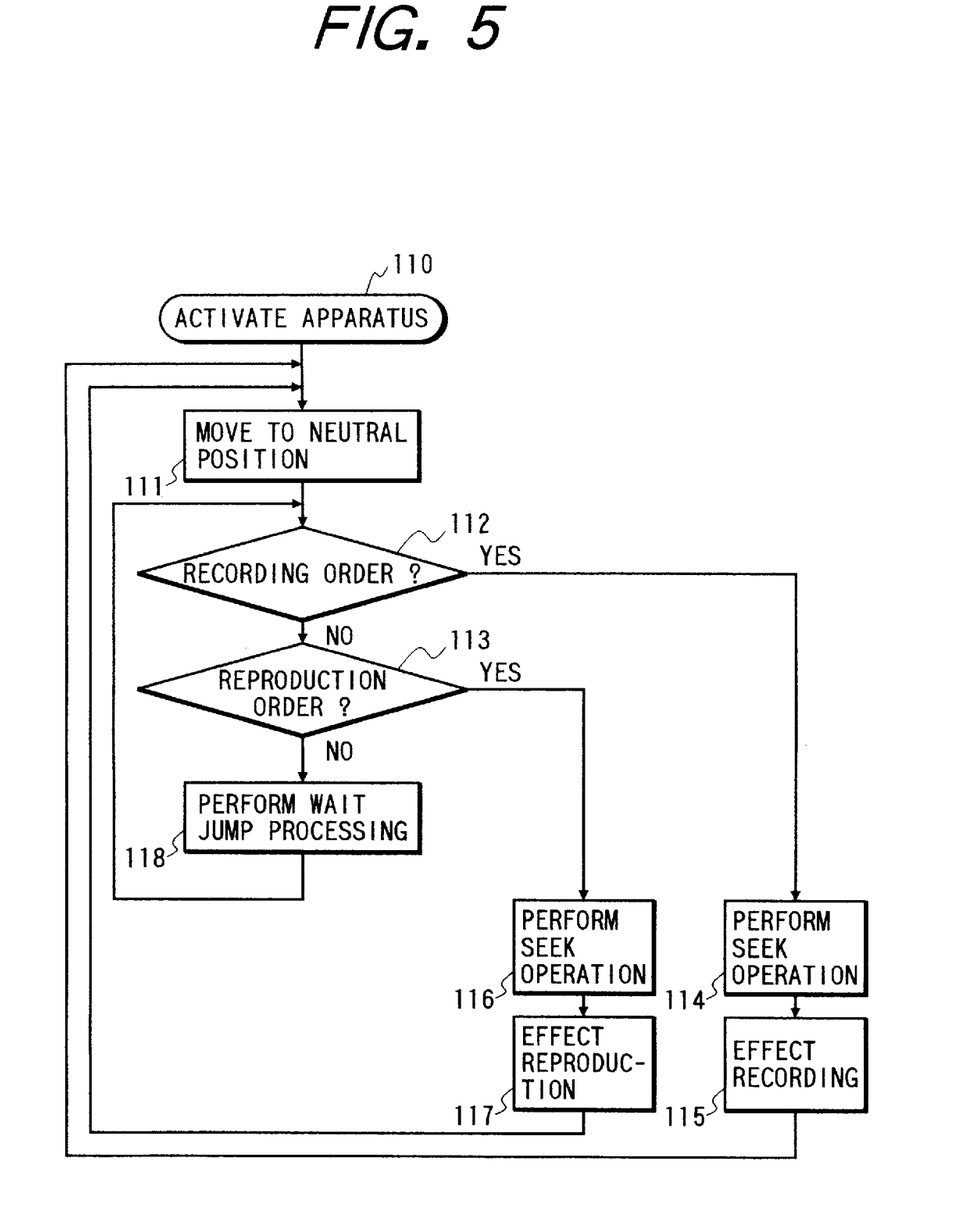
FIG. 5 is a flow chart showing the processing executed in the first embodiment of the present invention.

DETAILED DESCRIPTION OF THE PREFERRED EMBODIMENTS (1) Arrangement of the First Embodiment (FIGS. 4 and 5)

FIG. 4 is a block diagram showing the arrangement associated with an actuator control in that of an optical information recording/reproducing apparatus according to the present invention, and FIG. 5 is a flow chart showing the operation of this embodiment. As an actuator, the spring-supported actuator shown in FIGS. 1 and 2 above is used.

Referring to FIG. 4, an error signal generation device 101 generates error signals used for performing focusing control, tracking control, positioning control, and the like of the actuator using information from a sensor for detecting a beam reflected by an optical disk (not shown). An A/D converter 102 converts error signals into digital values. A CPU 103 performs servo control, such as focusing control, tracking control, positioning control, and the like of the apparatus. A memory 104 comprises a ROM storing the operation program of the CPU 103, a RAM for temporarily storing data of a servo system, and the like. A D/A converter 105 converts a digital drive signal output from the CPU 103 into an analog value. A driver circuit 106 supplies a current to the actuator in accordance with the drive signal. A system controller 107 receives an instruction from a computer connected to this apparatus, and sends an order associated with servo control to the CPU 103 in accordance with the received instruction. With the above-mentioned arrangement, the CPU 103 can perform focusing control, tracking control, positioning control, and the like of the actuator.

(2) Operation of the First Embodiment (FIGS. 4 and 5)

The operation of the first embodiment will be described below with reference to FIGS. 4 and 5. An objective lens of the actuator is located at the neutral position of springs since it does not receive any driving force before the apparatus is activated. The apparatus of this embodiment is activated in step 110 in FIG. 5. The apparatus is activated by starting focusing servo control and tracking servo control. Immediately after activation, the objective lens of the actuator is located at the neutral positions of the springs. In this state, address information is reproduced from a recording medium, and is stored in the memory 104. Furthermore, the CPU 103 executes step 111 in FIG. 5. In step 111, the CPU 103 generates an order for moving the objective lens to the neutral position of the springs. At this time, the objective lens is not moved since it is located at the neutral position.

Thereafter, the CPU 103 executes a loop consisting of steps 112, 113, and 118, and waits for a recording or reproducing order from the system controller 107 while the objective lens is located at the neutral position of the springs. The CPU 103 executes wait jump processing (step 118) so as to prevent the irradiation position of a beam spot from moving along spiral tracks. The wait jump processing is attained by monitoring the revolutions of the disk and returning the objective lens position by one track upon detection of one revolution of the disk. Upon reception of the recording order in step 112, the CPU 103 moves the irradiation position of the beam spot to an address designated by the system controller by the positioning control of the actuator in step 114, and records information on the recording medium in step 115. In this case, focusing servo and tracking servo are executed by a servo loop constituted by the error signal generation device 101 for generating error signals based on information from the sensor, the A/D converter 102, the CPU 103, the D/A converter 105, the driver circuit 106, and the actuator.

Upon completion of the recording operation, the CPU 103 drives the actuator to the neutral position of the springs, and restarts a wait operation in a state wherein the CPU 103 is ready to receive the recording or reproducing order.

Upon reception of the reproducing order in step 113, the CPU 103 moves the irradiation point of the beam spot to an address designated by the system controller by the positioning control of the actuator in step 116, and reproduces information from an optical disk as the recording medium in step 117. Upon completion of the reproduction operation, the CPU 103 drives the actuator to the neutral position of the springs, and restarts a wait operation in a state wherein the CPU 103 is ready to receive the recording or reproducing order.

In this embodiment, the processing can be simplified by the following method. The actuator is arranged so that the center of the movable range of the actuator matches the center of the track range of the recording medium. Furthermore, address information corresponding to the center of the track range of the recording medium is stored in the memory 104 upon assembling of the actuator. In this case, in step 111 in FIG. 5, the position of the objective lens is moved to the address stored in the memory 104, i.e., the address corresponding to the center of the track range. With the above-mentioned processing, the objective lens can be moved to the neutral position of the springs, thus practicing this embodiment.

(3) Effect Unique to the First Embodiment

With the above-mentioned control, the spring-supported actuator does not require any electric power to be consumed by driving the actuator against the force of the springs during the wait operation for receiving the recording or reproducing order, thus reducing electric power to be consumed by the optical disk apparatus.

Figure 6:
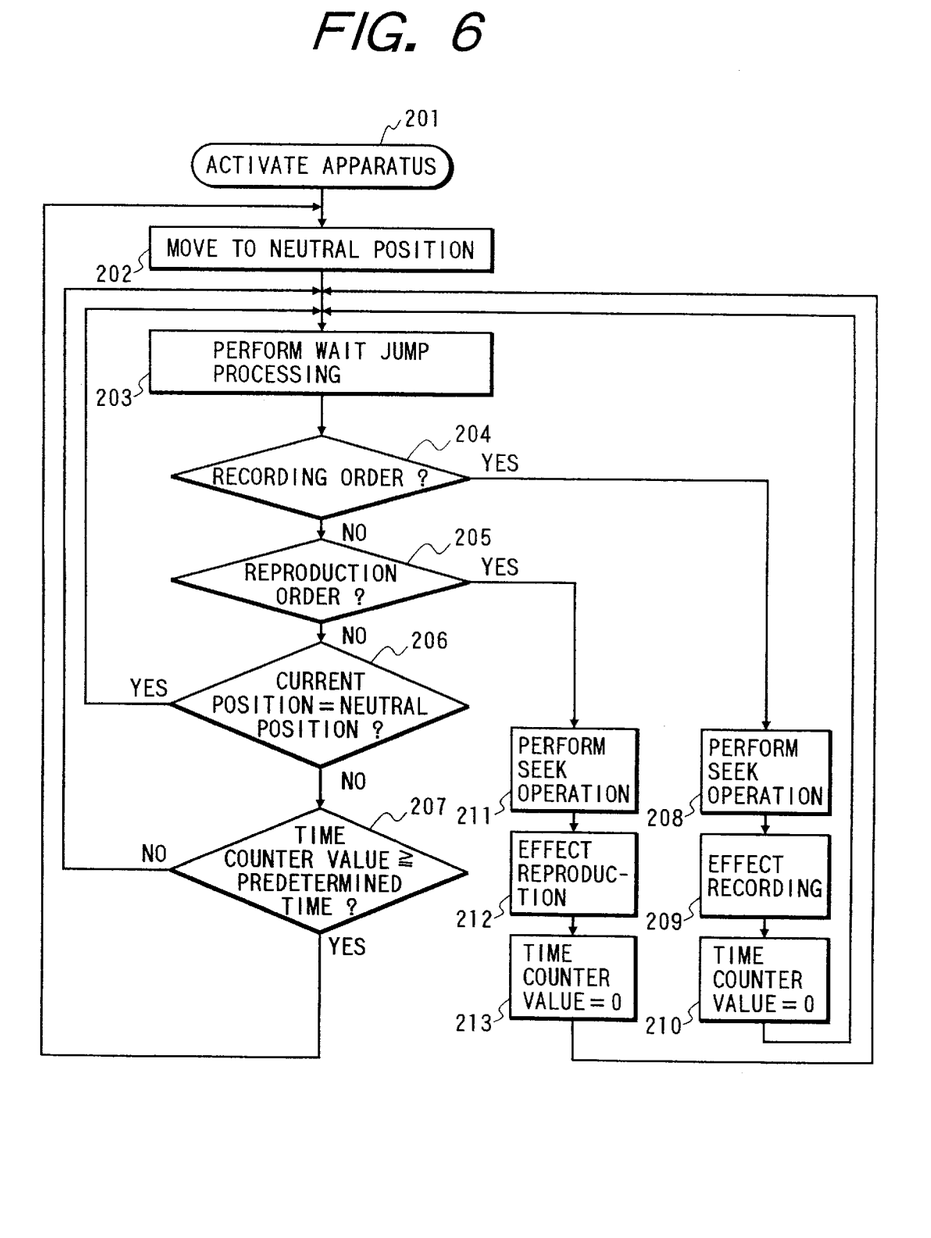
FIG. 6 is a flow chart showing the processing executed in the second embodiment of the present invention.

(1) Arrangement of the Second Embodiment (FIGS. 4 and 6)

The apparatus of this embodiment executes the operation shown in FIG. 6 using the arrangement shown in FIG. 4 described in the first embodiment. Therefore, the description of the arrangement of the control system of this embodiment is the same as that of the first embodiment.

(2) Operation of the Second Embodiment (FIGS. 4 and 6)

The operation of the second embodiment will be described below with reference to FIG. 6. This apparatus is activated in step 201 in FIG. 6. At this time, the CPU 103 obtains an address corresponding to the neutral position of the leaf springs of the actuator, and stores it in the memory 104 as in the first embodiment. The CPU 103 locates the objective lens at the neutral position of the leaf springs of the actuator in step 202, and executes wait jump processing in step 203. The wait jump processing is attained by monitoring the revolutions of the disk and returning the objective lens by one track upon detection of one revolution of the disk. Thereafter, it is checked in step 205 if a recording or reproducing order is received from the system controller 107.

The following explanation will be given under an assumption that no order is received from the system controller 107, i.e., "No" is determined in step 205. In step 206, the CPU 103 discriminates the current position of the objective lens. In this case, since the objective lens is located at the neutral position of the leaf springs of the actuator, the processing of the CPU 103 advances along the "Yes" branch path of step 206. Thereafter, the CPU 103 executes a loop consisting of steps 203, 204, 205, and 206, and the "Yes" branch path of step 206 until it receives an order from the system controller 107. With this loop, the apparatus waits for an order from the system controller 107 while executing the wait jump processing.

Assume that the CPU 103 receives a recording order from the system controller 107. In this case, the CPU 103 executes step 208 via branch step 204 shown in FIG. 6. With this step, the actuator is driven, and the irradiation point of the beam spot moves to the recording address designated by the system controller 107. Furthermore, in step 209, the recording operation of information is performed. Upon completion of the recording operation, the CPU 103 resets the value of a time counter to zero in step 210, and the flow returns to the wait jump processing in step 203.

The CPU 103 discriminates the order from the system controller 107 in steps 204 and 205. In this case, assume that no order is received from the system controller 107. In step 206, the CPU 103 discriminates the current position of the objective lens. In this case, the objective lens position corresponds to the position of the track subjected to the above-mentioned recording operation. Thus, the CPU 103 determines "No" in step 206, and the flow branches to step 207. In step 207, the CPU 103 discriminates the value of the time counter. The time counter increments its value as the time elapses. Assume that the value of the time counter has not reached a predetermined value. Thus, the CPU 103 determines "No" in step 207. Thus, the CPU 103 executes a loop consisting of steps 203, 204, 205, 206, and 207, and the "No" branch path of step 207, until the value of the time counter has reached the predetermined value, thus performing the wait operation. During this interval, the actuator is driven against the counterforce of the leaf springs.

Assume that a predetermined period of time has elapsed, and the value of the time counter has reached the predetermined value. The CPU 103 executes steps 203, 204, 205, and 206 as in the above description, and then executes step 207. At this time, since the value of the time counter has reached the predetermined value, the CPU 103 determines "Yes" in step 207. Thus, the CPU 103 executes step 202 to drive the actuator, thus moving the objective lens to the neutral position of the leaf springs of the actuator. Thereafter, the CPU 103 executes a loop consisting of steps 203, 204, 205, and 206, and the "Yes" branch path of step 206 so as to perform the wait operation.

Furthermore, assume that the CPU 103 receives a reproducing order from the system controller. The CPU 103 executes step 211 via branch step 205 shown in FIG. 6. With this step, the CPU 103 moves the irradiation point of the beam spot to the address designated by the system controller as in the recording operation, and performs a reproduction operation of information in step 212. Thereafter, the CPU 103 resets the value of the time counter to zero in step 210, and the flow then returns to the wait jump processing in step 203.

As in the recording operation, the CPU 103 performs the wait operation while holding the objective lens position at the reproduction position until the value of the time counter reaches the predetermined value. After the value of the time counter has exceeded the predetermined value, the CPU 103 moves the objective lens to the neutral position of the leaf springs of the actuator, and performs the wait jump processing to prepare for the next order from the system controller.

(3) Effect Unique to the Second Embodiment

With the above-mentioned operation, the spring-supported actuator does not require any electric power to be consumed by the springs during a time interval other than the servo time and the predetermined time, thus reducing electric power to be consumed by the optical disk apparatus.

Furthermore, since the wait jump processing is performed at the position subjected to the recording or reproduction operation during the predetermined period of time after the recording or reproduction operation, when the position within the predetermined range on the recording medium is to be frequently accessed, the actuator is not driven to the neutral position of the springs after one recording or reproduction operation, thereby preventing an increase in access time.

Figure 7:
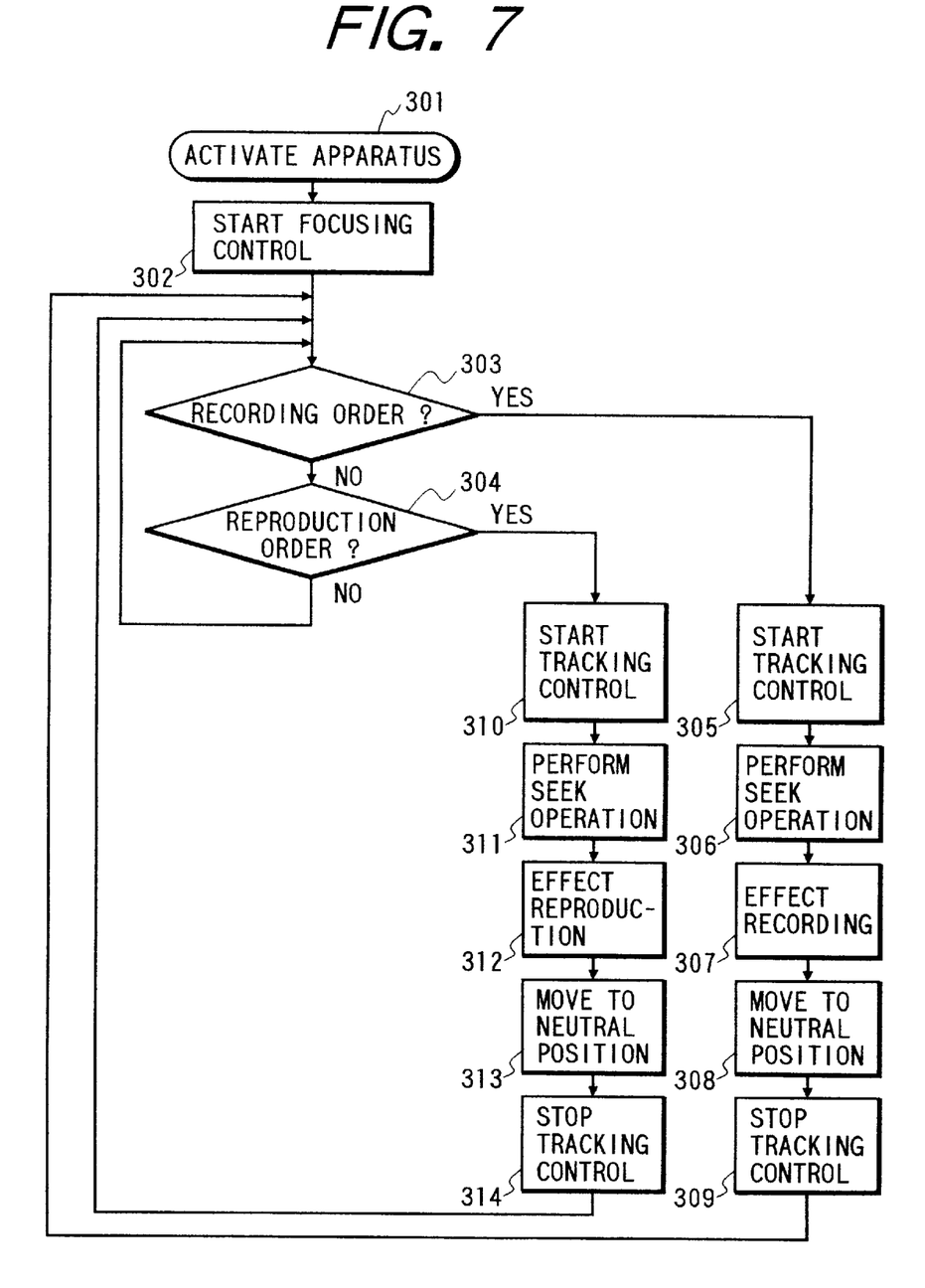
FIG. 7 is a flow chart showing the processing executed in the third embodiment of the present invention.

(1) Arrangement of the Third Embodiment (FIGS. 4 and 7)

The apparatus of this embodiment executes the operation shown in FIG. 7 using the arrangement shown in FIG. 4 described in the first embodiment. Therefore, the description of the arrangement of the control system of this embodiment is the same as that of the first embodiment.

(2) Operation of the Third Embodiment

The operation of the third embodiment will be described below with reference to FIG. 7. When this apparatus is activated in step 301 in FIG. 7, the CPU 103 starts the focusing control of the objective lens in step 302. In this case, the CPU 103 does not start the tracking control. Thereafter, the CPU 103 executes a loop consisting of steps 303 and 304 to perform a wait operation while performing only the focusing control until it receives a recording or reproducing order from the system controller 107.

Assume that the CPU 103 receives a recording order from the system controller 107 in step 303. The CPU 103 executes step 305 to start the tracking control. Subsequently, the CPU 103 drives the actuator in step 306 to move the irradiation point of the beam spot to the address designated by the system controller 107. Furthermore, the CPU 103 records information in the designated segment on the designated track in step 307. Upon completion of the recording operation, the CPU 103 executes step 308 to drive the actuator so that the leaf springs are set in a neutral state. Furthermore, the CPU 103 stops the tracking control in step 309. Thereafter, the CPU 103 executes a loop consisting of steps 303 and 304 to wait for the next order from the system controller 107.

Furthermore, assume that the CPU 103 receives a reproducing order from the system controller 107 in step 304. The CPU 103 executes step 310 to start the tracking control. The CPU 103 drives the actuator in step 311 to move the irradiation point of the beam spot to the address designated by the system controller 107. Furthermore, the CPU 103 reproduces information in step 312. Thereafter, the CPU 103 executes step 313 to drive the actuator, so that the leaf springs are set in a neutral state. Furthermore, the CPU 103 stops the tracking control in step 314. Thereafter, the CPU 103 executes a loop consisting of steps 303 and 304 to wait for the next order from the system controller 107.

(3) Effect Unique to the Third Embodiment

With the above-mentioned control, since the optical information recording/reproducing apparatus using the spring-supported actuator does not require any electric power to be consumed by driving the actuator against the force of the springs, electric power consumed by the optical disk apparatus can be saved. Furthermore, since neither the tracking servo control nor the wait jump processing are executed unless the recording and reproducing orders are input, further power saving of the apparatus can be attained.

Figure 8:
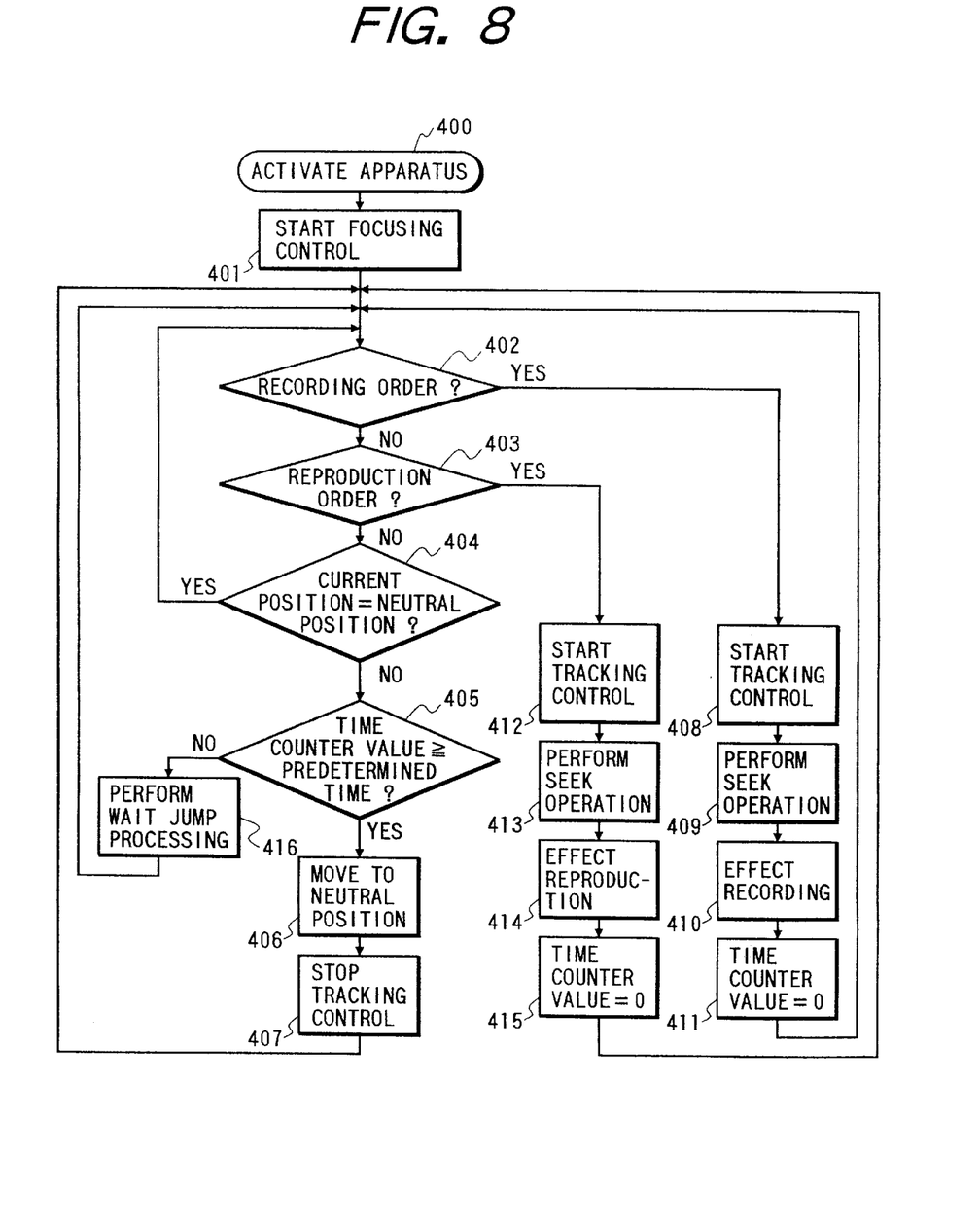
FIG. 8 is a flow chart showing the processing executed in the fourth embodiment of the present invention.

(1) Arrangement of the Fourth Embodiment (FIGS. 4 and 8)

The apparatus of this embodiment executes the operation shown in FIG. 8 using the arrangement shown in FIG. 4 described in the first embodiment. Therefore, the description of the arrangement of the control system of this embodiment is the same as that of the first embodiment.

(2) Operation of the Fourth Embodiment

The operation of the fourth embodiment will be described below with reference to FIGS. 4 and 8. When the apparatus shown in FIG. 4 is activated in step 400 shown in FIG. 8, the CPU 103 starts the focusing control of the objective lens in step 401. At this time, the CPU 103 does not start the tracking control. Thereafter, the CPU 103 executes a loop consisting of steps 402 and 404, and the "Yes" branch path of step 404 to wait for a recording or reproducing order from the system controller 107.

Assume that the system controller 107 issues a recording order. The CPU 103 advances its control along the "Yes" branch path of step 402, and starts the tracking servo control in step 408. The CPU 103 drives the actuator to move the irradiation point of the beam spot to the address designated by the system controller 107 in step 409, and performs a recording operation in step 410. Upon completion of the recording operation, the CPU 103 resets the value of a time counter to zero in step 411, and the flow then returns to step 402.

A reproduction operation is attained by the similar processing. Upon reception of a reproducing order from the system controller 107, the CPU 103 advances its control along the "Yes" branch path of step 403, and starts the tracking control in step 412. The CPU 103 drives the actuator to move the irradiation point of the beam spot to the address designated by the system controller 107 in step 413, and performs a reproduction operation in step 414. Upon completion of the reproduction operation, the CPU 103 resets the value of the time counter to zero in step 415, and the flow then returns to step 402

Upon completion of the recording or reproduction operation, the objective lens position corresponds to the track position where the recording or reproduction operation was performed. At this position, the CPU 103 executes a loop consisting of steps 402, 403, 404, 405, and 416 until the value of the time counter reaches a predetermined value. The apparatus of this embodiment waits for the next order from the system controller 107 by executing wait jump processing during a predetermined period of time from the end of the recording or reproduction operation. Upon reception of a recording or reproducing order during this period of time, the CPU 103 advances its control along the "Yes" branch path of step 402 or 403, and performs the recording or reproduction operation. At this time, since the tracking servo control has already been started, the processing for starting the tracking servo control in step 408 or 412 is omitted.

A case will be explained below wherein no recording or reproducing order is received from the system controller 107 before the elapse of the predetermined period of time from the end of the recording or reproduction operation. The CPU 103 advances its control along the "Yes" branch path of step 405, and moves the objective lens to the neutral position of the leaf springs in step 406. Furthermore, the CPU 103 stops the tracking servo control in step 407. Thereafter, the CPU 103 executes steps 402 and 403, and then executes branch step 404. At this time, since the objective lens position corresponds to the neutral position of the leaf springs, the CPU 103 advances its control along the "Yes" branch path of step 404. Thus, the CPU 103 waits for the next order from the system controller 107 while stopping the tracking servo control by executing a loop consisting steps 402, 403, and 404, until it receives a recording or reproducing order from the system controller 107.

(3) Effect Unique to the Fourth Embodiment

With the above-mentioned control, since the apparatus using the spring-supported actuator does not require any electric power to be consumed by driving the actuator against the force of the springs, electric power to be consumed by the optical disk apparatus can be reduced.

Furthermore, since neither the tracking servo control nor the wait jump processing are performed unless a recording or reproducing order is received, further power saving of the apparatus can be attained.

Since the wait jump processing is performed at the position where the recording or reproduction operation was performed before an elapse of a predetermined period of time from the end of the recording or reproduction operation, when the recording medium is to be frequently accessed, the control of the actuator can be prevented from being disabled after every recording or reproduction operation, thereby preventing an increase in access time due to power saving.

(1) Arrangement of the Fifth Embodiment (FIG. 4 and FIGS. 9A to 9C)

Figure 9A:
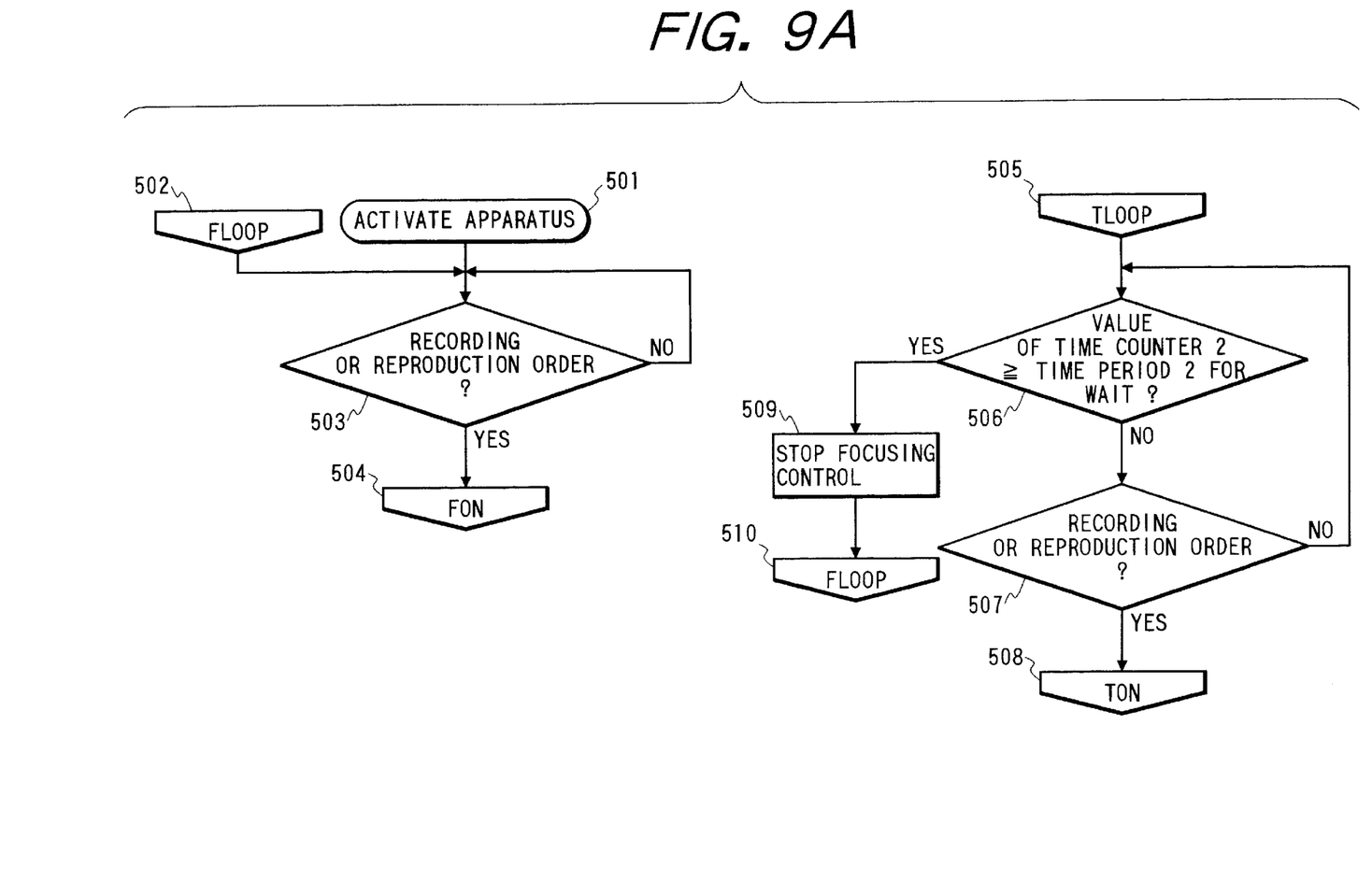
FIGS. 9A to 9C are flow charts showing the processing executed in the fifth embodiment of the present invention.
Figure 9B:
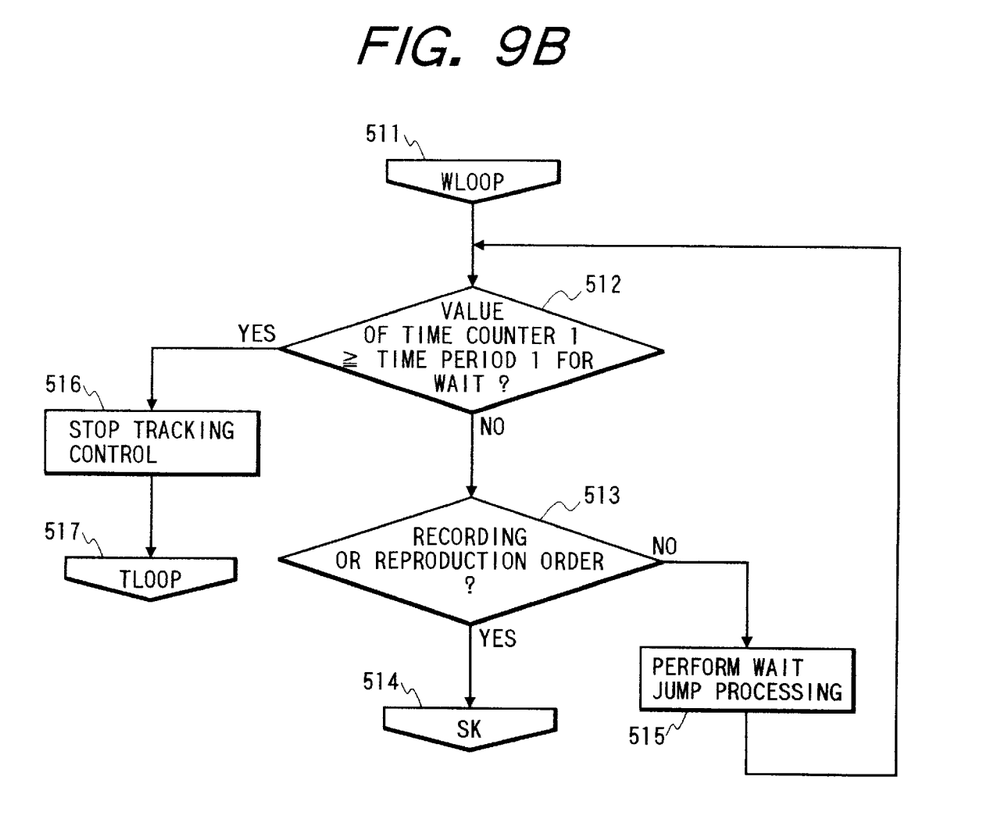
Figure 9C:
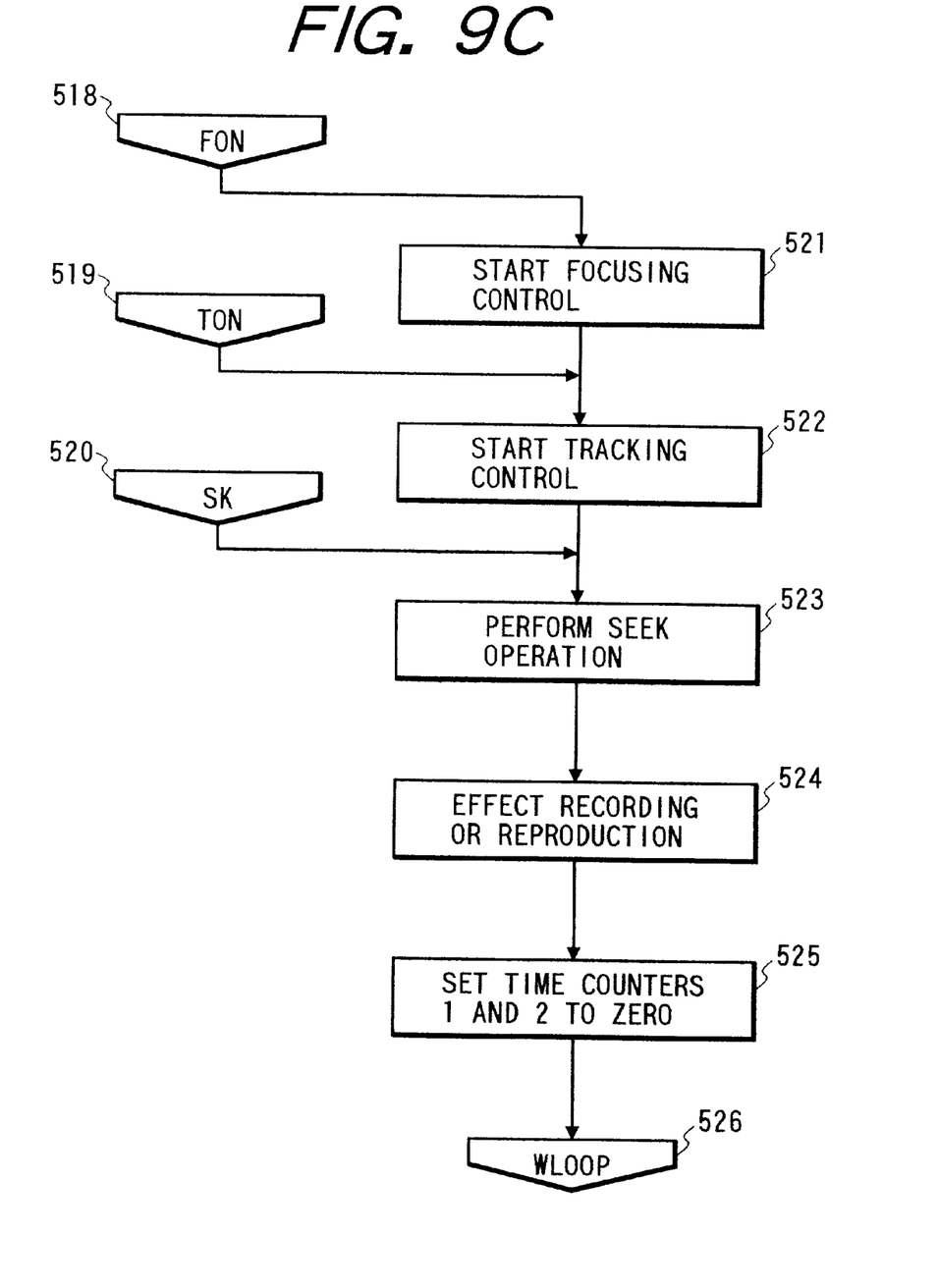

The apparatus of this embodiment executes the operation shown in FIGS. 9A to 9C using the arrangement shown in FIG. 4 described in the first embodiment. Therefore, the description of the arrangement of the control system of this embodiment is the same as that of the first embodiment.

(2) Operation of the Fifth Embodiment

The operation of the fifth embodiment will be described below with reference to FIG. 4 and FIGS. 9A to 9C. When this apparatus is activated in step 501 in FIG. 9A, the CPU 103 performs conditional branch processing for discriminating the presence/absence of a recording or reproducing order in step 503. Step 503 corresponds to an order for branching the processing depending on whether or not the CPU receives an order from the system controller 107. This apparatus waits until it receives an order from the system controller 107. Assume that the CPU 103 receives a recording or reproducing order from the system controller 107. The CPU 103 advances its processing to step 504, and then to step 518. In accordance with the flow chart, the CPU 103 starts the focusing control in step 521, starts the tracking control in step 522, and drives the actuator in step 523, thus moving the irradiation point of the beam spot to the address designated by the system controller 107. Furthermore, the CPU 103 records or reproduces information in step 524. Upon completion of the recording or reproduction operation, the CPU 103 resets the values of time counters 1 and 2 to zero. Thereafter, the flow advances from WLOOP step 526 to WLOOP step 511.

The apparatus of this embodiment performs the wait jump operation at the track position where the recording or reproduction was performed, for a predetermined period of time from the end of the recording or reproduction operation. The CPU 103 compares the value of time counter 1 with predetermined time period 1 for waiting in step 512. As a result, if the CPU 103 determines that the value of the time counter has not reached predetermined time period 1 for waiting, the CPU 103 advances its processing to step 513, and checks if it receives a recording or reproducing order from the system controller 107. If the CPU 103 determines that it does not receive any order, the CPU 103 advances its processing to step 515, and performs wait jump processing. Thereafter, the flow returns to step 512.

The following description will be continued under an assumption that the value of the time counter is smaller than time period 1 for waiting. The CPU 103 advances its processing to step 513. At this time, assume that a recording or reproducing order from the system controller 107 is received. The CPU 103 advances its processing to SK (step 514), and then to step 520. Furthermore, the CPU 103 performs a seek operation in step 523, and records or reproduces information in step 524. Thereafter, the CPU 103 resets the values of time counters 1 and 2 to zero again, and the flow then advances from step 526 to step 511. Subsequently, the CPU 103 executes a loop consisting of steps 512, 513, and 515 so as to wait for the next order from the system controller 107 while performing the wait jump operation.

Assume that that time period 1 for waiting has elapsed from the end of the recording or reproduction operation. The apparatus of this embodiment performs the wait jump processing (step 515) for a predetermined period of time, and when a recording or reproducing order is not input during this period, the consumption power is saved by stopping the tracking servo control. When the CPU 103 determines the elapse of time period 1 for waiting in step 512, the flow advances to step 516. In this step, the tracking control is disabled. At this time, although the irradiation position of the beam spot is located at the last position of the recording or reproduction operation, the objective lens is returned to the neutral position of the leaf springs simultaneously with disabling the tracking control. Thereafter, the flow returns to step 505 via TLOOP step 517.

The CPU 103 processes step 506 to check if the value of time counter 2 is equal to time period 2 for waiting. The value of time period 2 for waiting is larger than that of time period 1 for waiting. Assume that the value of time counter 2 is smaller than time period 2 for waiting. The CPU 103 advances its processing to step 507 to check if a recording or reproducing order is input from the system controller 107. If an order is input, the CPU 103 advances its processing from TON step 508 to step 519, and starts the tracking control in step 522. Furthermore, the CPU 103 performs the seek control and the recording or reproduction operation.

On the other hand, if it is determined in step 507 that no order is input from the system controller 107, the CPU 103 processes a loop consisting of steps 506 and 507. If the value of the time counter becomes equal to or larger than the value of time period 2 for waiting, the CPU 103 advances its processing to step 509 to stop the focusing control, and then advances its processing from FLOOP step 510 to step 502 to wait for the next order from the system controller 107 while executing the loop of step 503. Upon reception of the recording or reproducing order from the system controller 107, the CPU 103 advances its processing to step 521 and the subsequent steps via FON steps 504 and 518 to start the focusing control and tracking control. The CPU 103 then performs the seek control and the recording or reproduction operation.

With the above-mentioned processing, the apparatus of this embodiment waits for an order by executing the wait jump operation, until an elapse of a predetermined period of time from the end of the recording or reproduction operation, and performs the wait operation while stopping the tracking control, after the elapse of the predetermined period of time. Furthermore, when the recording or reproducing order is not input for a predetermined period of time, the apparatus of this embodiment performs the wait operation while stopping the focusing control in addition to the tracking control. When the focusing control is stopped, further power saving can be achieved by performing the wait operation in a state wherein the laser and functions associated with recording/reproduction are disabled.

(3) Effect Unique to the Fifth Embodiment

With the above-mentioned processing, the apparatus using the spring-supported actuator can further reduce power consumption by stopping the tracking servo control or both the tracking servo control and the focusing servo control in correspondence with the frequency of the recording or reproduction operations. In this embodiment, the objective lens is moved to the neutral position of the leaf springs by utilizing the force of the leaf springs by stopping the tracking servo control. Thus, since no seek operation of the objective lens to the neutral position of the leaf springs is required unlike in the first to fourth embodiments, power consumption can also be reduced.

Since the tracking servo control or both the tracking servo control and the focusing servo control are stopped in correspondence with the frequency of the recording or reproduction operations, an increase in access time caused by the tracking control or the pull-in or seek control of the focusing servo can be prevented.

The first to fifth embodiments of the present invention have been described. The programs for the flow charts of these embodiments may be stored in the memory 104, and a function of selecting one of these programs to be used may be provided. In this case, an appropriate operation can be performed in accordance with the use state of the information recording/reproducing apparatus, thus simultaneously attaining a reduction of power consumption and a decrease in access time.

Figure 10:
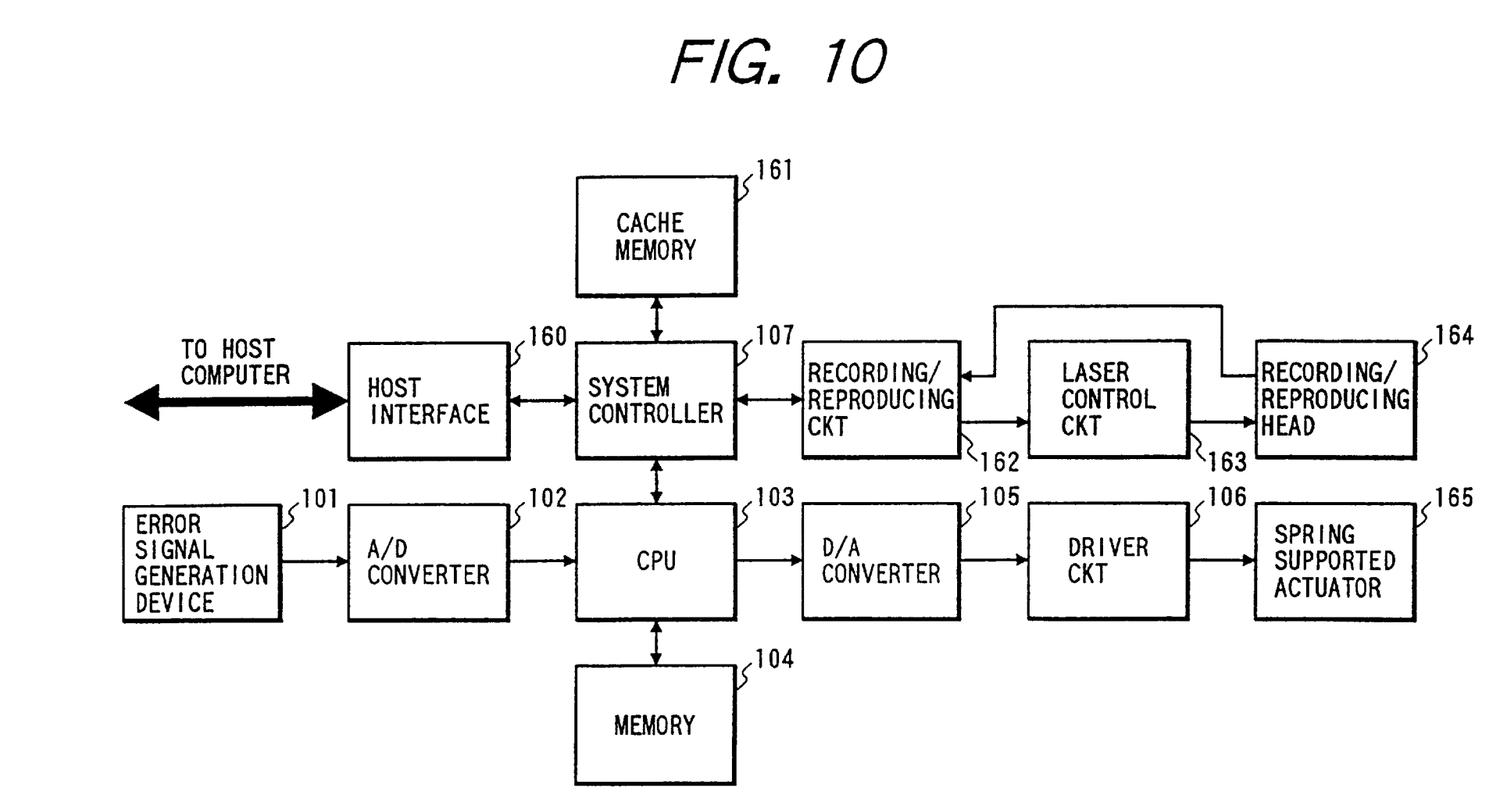
FIG. 10 is a block diagram showing a portion of the arrangement of the present invention.
Figure 11:
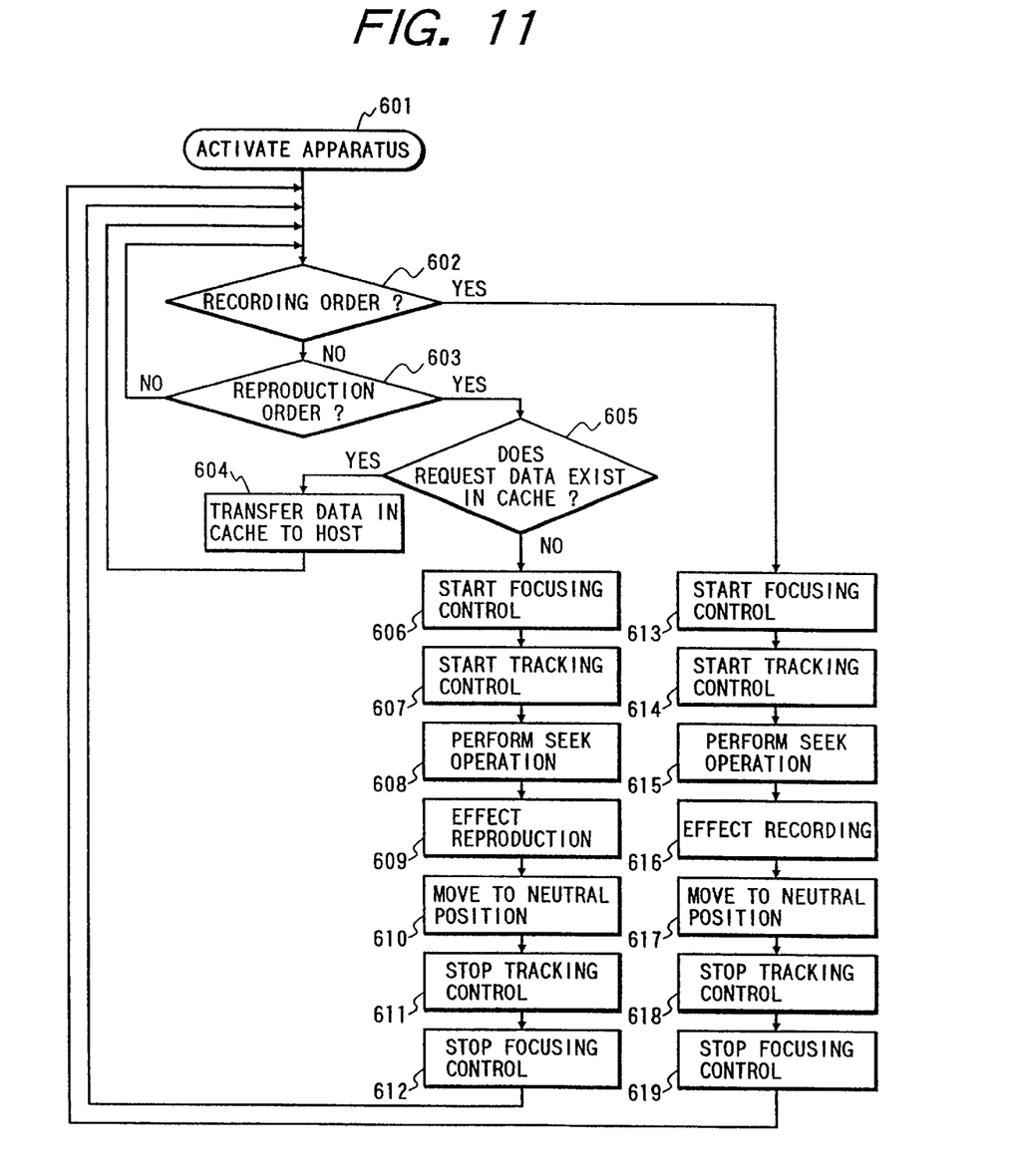
FIG. 11 is a flow chart showing the processing executed in the sixth embodiment of the present invention.

(1) Arrangement of the Sixth Embodiment (FIGS. 10 and 11)

FIG. 10 is a block diagram showing the arrangement of this embodiment, and FIG. 11 is a flow chart showing the operation of this embodiment.

A host interface 160 exchanges data between the apparatus of this embodiment, and a host computer to which this apparatus is connected. A cache memory 161 temporarily stores data received by the host interface. A recording/reproducing circuit 162 modulates a recording signal or demodulates a reproduction signal read from the disk surface using a recording/reproducing head 164. A laser control circuit 163 controls a laser in accordance with a recording signal. The recording/reproducing head 164 irradiates a convergent laser beam onto the disk surface, and receives a beam reflected by the disk surface, thus reading information on the disk. The head 164 records information on the disk by changing the intensity of the convergent laser beam. Note that the same reference numerals in FIG. 10 denote the same parts as in FIG. 4, and a detailed description thereof will be omitted.

(2) Operation of the Sixth Embodiment (FIGS. 10 and 11)

In this embodiment, the activation frequency of the recording/reproducing system, the focusing servo control, and the tracking servo control of the apparatus is reduced by temporarily storing information to be frequently accessed such as directory information of a disk in the cache memory 161, thereby reducing electric power consumed by the focusing servo and the tracking servo of the spring-supported actuator.

The recording operation of the sixth embodiment will be described below with reference to FIGS. 10 and 11. The power supply of this apparatus is turned on, thus activating the apparatus. Step 601 shown in FIG. 11 indicates activation of this apparatus. The CPU 103 waits for a recording or reproduction request from the host computer by repetitively executing steps 602 and 603. Assume that the host computer transfers an information recording request and recording information to this apparatus. These pieces of information are transferred to the system controller 107 via the host interface 160 shown in FIG. 10. Upon reception of the recording request, the system controller 107 requests the CPU 103 to execute the recording operation. With this request, the CPU 103 advances its processing along the "Yes" branch path of step 602, and executes steps 613 and 614 to start the focusing servo and tracking servo. Then, the CPU 103 executes the seek control in step 615. The seek control is attached by driving the actuator to move the irradiation point of the beam spot to the address designated by the system controller 107. Furthermore, the CPU 103 performs the recording operation of the information received from the host computer in step 616. The recording operation is attained by modulating information sent from the host computer into a signal format that can be written on the disk by the recording/reproducing circuit 162, and sending the modulated information to the recording/reproducing head 164. Upon completion of the recording operation, the CPU 103 seeks the reproduction point until the springs of the actuator are set in a neutral state. Furthermore, the CPU 103 stops the tracking servo and the focusing servo in steps 618 and 619. The flow then returns to step 602, and the CPU 103 executes the loop processing, i.e., the wait operation for the next recording or reproduction operation request.

The reproduction operation is attained by the following processing. First, an example of the operation of the cache memory will be explained below. The cache memory is a semiconductor memory having a relatively small storage capacity as compared to the optical disk used by the apparatus. In this embodiment, the cache memory is used for temporarily storing information read from the disk. When the apparatus reproduces information on the disk, it sends reproduced data to the host computer, and simultaneously stores it in the cache memory. The cache memory is divided into blocks, and information storage is attained by recording reproduced data for one operation in one block. The information storage operation is performed for an empty block. However, when the number of reproduction operations exceeds the number of blocks, no empty block is present in the cache memory. Thus, upon execution of the next reproduction operation, the read frequencies of the blocks in the cache memory are compared, information in the block with the lowest reproduction frequency is discarded, and new reproduced information is stored in this block.

The actual reproduction operation will be described below. Assume that the CPU 103 waits for a recording or reproduction request by executing the loop consisting of steps 602 and 603. Upon reception of a reproducing order from the system controller, the CPU 103 advances its processing along the "Yes" branch path of step 603. In step 605, the CPU 103 inquires the system controller 107 if the information requested from the host computer is stored in the cache memory 161. If the requested information is not stored in the cache memory, the flow advances to step 606, and the CPU 103 starts the focusing servo. Furthermore, the CPU 103 starts the tracking control in step 607. In step 608, the CPU 103 performs the seek operation, i.e., drives the actuator to move the irradiation point of the beam spot to the address designated by the system controller. Furthermore, the CPU 103 requests the reproduction operation for reading out information on the disk to the system controller in step 609. The system controller receives information on the disk read by the recording/reproducing head 164 via the recording/reproducing circuit 162, and transfers it to the host computer. At the same time, the system controller stores the read information in an empty block of the cache memory 161. Upon completion of the above-mentioned reproduction operation, the CPU 103 seeks the reproduction point until the springs of the actuator are set in a neutral state. Furthermore, the CPU 103 stops the tracking servo and the focusing servo in steps 618 and 619. The flow then returns to step 602 to execute the loop processing, i.e., the wait operation for the next recording or reproduction operation request.

Assume that the host computer issues a reproduction request again. Upon reception of a reproducing order from the system controller, the CPU 103 advances its processing along the "Yes" branch path of step 603. In step 605, the CPU 103 inquires the system controller 107 if information requested from the host computer is stored in the cache memory 161. Assume that the requested information is the same as the previously reproduced information, and is stored in the cache memory. In step 604, the system controller transfers data in the cache memory to the host computer, and sends back a response indicating that the requested data is stored in the cashe memory to the CPU 103. Upon reception of this response, the CPU 103 returns its processing to step 602 without starting either the focusing servo or the tracking servo, and executes the loop processing, i.e., the wait operation for the next recording or reproduction operation request.

(3) Effect Unique to the Sixth Embodiment

With the above-mentioned control, only when the host computer requests data which is not stored in the cache memory, the focusing servo and tracking servo are activated. For this reason, electric power consumed by the springs can be further reduced, and the power consumption of the optical disk apparatus can be reduced.

In an operation for frequently accessing identical data or data recorded in the predetermined range on the disk, the focusing servo and the tracking servo are not activated, and data in the cache memory is transferred to the host computer, thus preventing an increase in access time.

What is claimed is:

1. An optical information recording/reproducing apparatus capable of performing at least one of recording of information onto and reproduction of information from an optical recording medium having a track area where a plurality of tracks are arranged side by side, said apparatus comprising:

an objective lens for forming a beam spot on one of the plurality of tracks;

an elastic member supporting said objective lens, said elastic member being capable of undergoing elastic deformation so that said objective lens can be moved across the tracks, over the entire track area;

an actuator for moving said objective lens across the tracks, over the entire track area; and a controller for driving said actuator to access a beam spot to a desired track, wherein said controller drives said actuator so that said objective lens is moved to (i) an irradiation position for irradiating a desired track with a beam spot in an operation mode to perform recording or reproduction, and (ii) a neutral position for bringing said elastic member to a neutral state in a stand-by mode to perform neither recording nor reproduction.

2. An apparatus according to claim 1, wherein said controller switches from the operation mode to the stand-by mode when a predetermined time has elapsed after recording or reproduction is completed in the operation mode.

3. An apparatus according to claim 1, wherein said controller has a memory which stores an address of a specific track position where said elastic member is brought to a neutral state and said objective lens is located to the specific track position based on the stored address in the stand-by mode.

4. An apparatus according to claim 1, further comprising a tracking servo loop for performing tracking control of a beam spot, wherein said controller turns off the tracking servo loop in the stand-by mode.

5. An apparatus according to claim 1, further comprising a focusing servo loop for performing focusing control of a beam spot, wherein said controller turns off the focusing servo loop in the stand-by mode.

6. An apparatus according to claim 1, further comprising a cache memory for storing reproduced information, wherein said controller checks the contents of said cache memory and drives said actuator to move said objective lens only when information to be reproduced is not stored in said cache memory.

7. A method of performing at least one of recording and reproduction of information by using an optical information recording/reproducing apparatus capable of performing at least one of recording of information onto and reproduction of information from an optical recording medium having a track area where a plurality of tracks are arranged side by side, said method comprising:

forming a beam spot on one of the plurality of tracks using an objective lens;

supporting the objective lens by an elastic member, the elastic member being capable of undergoing elastic deformation to move the objective lens across the tracks, over the entire track area;

moving the objective lens across the tracks, over the entire track area, using an actuator;

driving the actuator to access a beam spot to a desired track, using a controller, wherein the controller drives the actuator to move the objective lens (i) to an irradiation position for irradiating a desired track with a beam spot in an operation mode to perform recording or reproduction and (ii) to a neutral position where the elastic member is brought to a neutral state in a stand-by mode to perform neither recording nor reproduction;

locating the objective lens over a target track by driving the actuator;

irradiating the target track with a beam spot to effect recording or reproduction; and moving the objective lens to the neutral position.

* * * * *